United States Patent [19]

Holthoff et al.

[11] Patent Number: 4,879,924
[45] Date of Patent: Nov. 14, 1989

[54] GEARING FOR DRIVING THE ROLLS OF A ROLL TRAIN

[75] Inventors: Helmut Holthoff, Düsseldorf; Hermann Möltner, Ratingen, both of Fed. Rep. of Germany

[73] Assignee: Kocks Technik GmbH & Co., Hilden, Fed. Rep. of Germany

[21] Appl. No.: 225,927

[22] Filed: Jul. 29, 1988

[30] Foreign Application Priority Data

Sep. 3, 1987 [DE] Fed. Rep. of Germany ....... 3729470

[51] Int. Cl.$^4$ ........................... F16H 1/30; F16H 1/40
[52] U.S. Cl. .......................................... 74/799; 74/713
[58] Field of Search .......................... 74/799, 713, 675

[56] References Cited

U.S. PATENT DOCUMENTS

| | | | |
|---|---|---|---|
| 2,666,876 | 1/1954 | Sinclair | 74/799 |
| 2,680,972 | 6/1954 | Tone | 74/799 X |
| 2,771,791 | 11/1956 | Bachman | 74/713 X |

FOREIGN PATENT DOCUMENTS 1802987  5/1969  Fed. Rep. of Germany.
3001342  7/1981  Fed. Rep. of Germany.

Primary Examiner—Dirk Wright
Attorney, Agent, or Firm—Buchanan Ingersoll

[57] ABSTRACT

The invention concerns a gear unit for driving the rolls of a roll train with a number of consecutively arranged roll stands. This gear unit has planetary gear sets at at least one output shaft, which are located one behind the other at short distances. Due to a crosshead provided in accordance with the invention, the output shaft of each planetary gear set is relieved of bearing forces and the torques of the gears, such that it can have a small diameter, which in turn permits a building up of the planetary gear set, such that the operating torque and the operating r.p.m.'s of the planetary gear sets can be considerably higher than in the familiar construction types.

7 Claims, 3 Drawing Sheets

GEARING FOR DRIVING THE ROLLS OF A ROLL TRAIN

The invention concerns a gear unit for driving the rolls of a roll train with a number of consecutively arranged roll stands, in which a planetary gear set comprised of bevel gears is provided at at least one output shaft, the planetary gear axis or axes of which run crosswise to the output shaft and the sun gears of which are arranged coaxially to the output shaft.

Such gear units can be deduced, for example, from the DE-OS 18 02 987 and the DE-OS 30 01 342. They are used particularly frequently in roll trains for the production of tube, especially in the stretch-reduction roll trains. In addition, other applications are also conceivable, in which such gear units can be used.

These gear units have proven themselves in practice because they facilitate a speed regulation of the output shaft within a broad range through the addition of two different r.p.m.'s and possibly also directions of rotation. With the further development of the roll trains, however, ever higher speeds are required at the output shaft and also increasingly higher torques. The spacing of the consecutively arranged roll stands of the roll trains and thus the spacing of the output shafts should however be maintained and if possible even reduced in order to improve the profitability of the roll train, for which a closer stand spacing is required. Thus, the mutual spacing is prescribed for the planetary gear sets and the space available for each of them is established. An increase in the torque at the output shaft requires a larger shaft diameter in the familiar construction, but also larger dimensions of the planetary and sun gears. However, both can be achieved only if the limited space available due to the set spacing of the output shafts is sufficient.

With an increase in the r.p.m.'s, one also runs into limits because the bearings of the planetary gears are increasingly loaded by the centrifugal and gyrostatic forces with increasing speed. These forces are greater, the farther the planetary gears are from the axis of the planetary gear set and thus the output shaft. With respect to the loading of the planetary gear bearings, one must therefore take care that its spacing from the output shaft does not become too great, which limits the admissible torque, which when it increases also requires a greater building up of the planetary gears and thus of the said spacing. Thus, one runs into structural limitations when the admissible torque and/or the r.p.m.'s are increased, which also restrict the performance and profitability of the roll train.

The invention proposes a gear unit of the above type, in which in spite of the same spacing of the output shafts the torque available on them and/or the r.p.m.'s present there are higher than in the familiar structural types.

This problem is solved according to the invention in that neither the sun gears nor other gears are supported on the output shaft, but in the gear unit housing and the latter has a crosshead running parallel to the output shaft and with radially projecting bearings for supporting these gears. The primary result of this is that the output shaft designed as a differential shaft is no longer used as a bearing component for the entire planetary gear set nor any longer as a support for the gears that supply both rotational movements of the planetary gear set. The output shaft is thus relieved of all additional stresses, such that they are now acted upon only by the torque, which is transferred at its output journal to the roll stands. This relieving of the output shaft is substantial, such that it can be considerably more slender than in the familiar construction types. There is thus more space available in the radial direction inward with the same spacing of the output shafts, such that the spacings of the planetary gear bearings from the output shaft axis can be kept smaller. This permits higher r.p.m.'s because the bearing load due to centrifugal and gyrostatic forces was reduced. The torques can also be increased because the output shaft is loaded only by them and no longer by other bearing forces. The planetary gear bearings can have a greater width because more space is available for these bearings with an identical axis spacing of the output shafts. On the whole, the planetary gear set according to the invention is very stable because the robust crosshead can support any required number of bearings for the various gears without loading the output shaft thereby.

In a preferred implementation of the invention the crosshead is detachably fastened on the walls of the gear unit housing and forms a separate insertable and removable unit with the planetary gear set. The overall unit can be rapidly mounted and demounted, which facilitates a rapid replacement with only brief downtimes in the case of damage. It is recommended to hold the crosshead by means of bearing bushes that can be inserted from the outside into the bearing holes of the housing wall. It is possible in this manner to design the gear unit housing without parting lines, which substantially reduces the production costs. Nevertheless, the planetary gear sets can be easily removed by withdrawing the bearing bushes from the bearing holes of the housing wall and reinserting them in a corresponding manner in the reverse sequence.

It is particularly advantageous if the output shaft is flexible in the radial direction in the region of the planetary gears. The flexible bearing support in the radial direction permits a limited movement of the planetary gears also radially to the output shaft so that they are able to automatically adjust to the sun gears. A uniform distribution of the load on all the planetary gears present is thus achieved, such that overloads of the individual planetary gears are reliably avoided. For this reason, it is no longer necessary to design the planetary gears with respect to the maximum possible peak load that arises on an individual planetary gear when they are nonuniformly loaded; rather the normal operating torque can be correspondingly increased. In other words, the bearing support according to the invention with the use of a crosshead facilitates a somewhat flexible support of the output shaft in the radial direction in the region of the planetary gears and thus an automatic adjustment of the planetary gears to the sun gears, by which a uniform loading of all the planetary gears is assured, so that their loadability can be fully utilized for the operating torque. Consequently, the latter is clearly larger. It can be readily transferred in spite of the considerably more slender output shaft because the latter is no longer subject to any other load.

It is expedient in the latter implementation to provide the output shaft in the region of the planetary gears with a bearing journal that is considerably more slender in diameter and which holds the output shaft flexibly in the radial direction through a movable bearing. This smaller bearing journal is to be dimensioned so that the forces at the planetary gears are capable when a unilateral load arises to deform this bearing journal to the extent that the nonuniform loading of the planetary gears is eliminated. On the other hand, this bearing journal of the output shaft, together with the movable bearing, offers an adequate run in the radial direction so as to avoid undesirable vibrations in the output shaft and thus also undesirable movements in the planetary gears.

In another implementation of the invention, the output shaft is inserted into a hole of a planetary gear holder in an axially displaceable manner, but proof against rotation, which has radially running planetary gear axes distributed on its periphery. It is possible with this design to insert the output shaft into the planetary gear set only after the latter is already inserted into the gear unit housing. The output shaft otherwise projecting in the axial direction due to its output journal then causes no problem when the planetary gear set is inserted into the gear unit housing; therefore, it can be conveniently mounted. If it is mounted, including the crosshead, the output shaft can be inserted from the outside. The axial displaceability between the output shaft axially fixed in the incorporated state and the planetary gear holder makes it possible, above all, for the planetary gears to be automatically adapted to the sun gears and also axially to the output shaft and thus local overloads are avoided, which otherwise could occur with a planetary gear holder bound fast with the output shaft. It is then advisable if the hole in the planetary gear holder has an internal toothing, into which the output shaft engages with a crowned external toothing. Such a toothing connects the planetary gear holder rotation-proof with the output shaft, but also allows it considerable mobility.

The invention is depicted in the drawings on the basis of an implementation example.

FIG. 1 shows a gear unit 1 that drives the roll stands 2, which constitute a stretch-reduction roll train for the production of tube for example.

Figure 1:
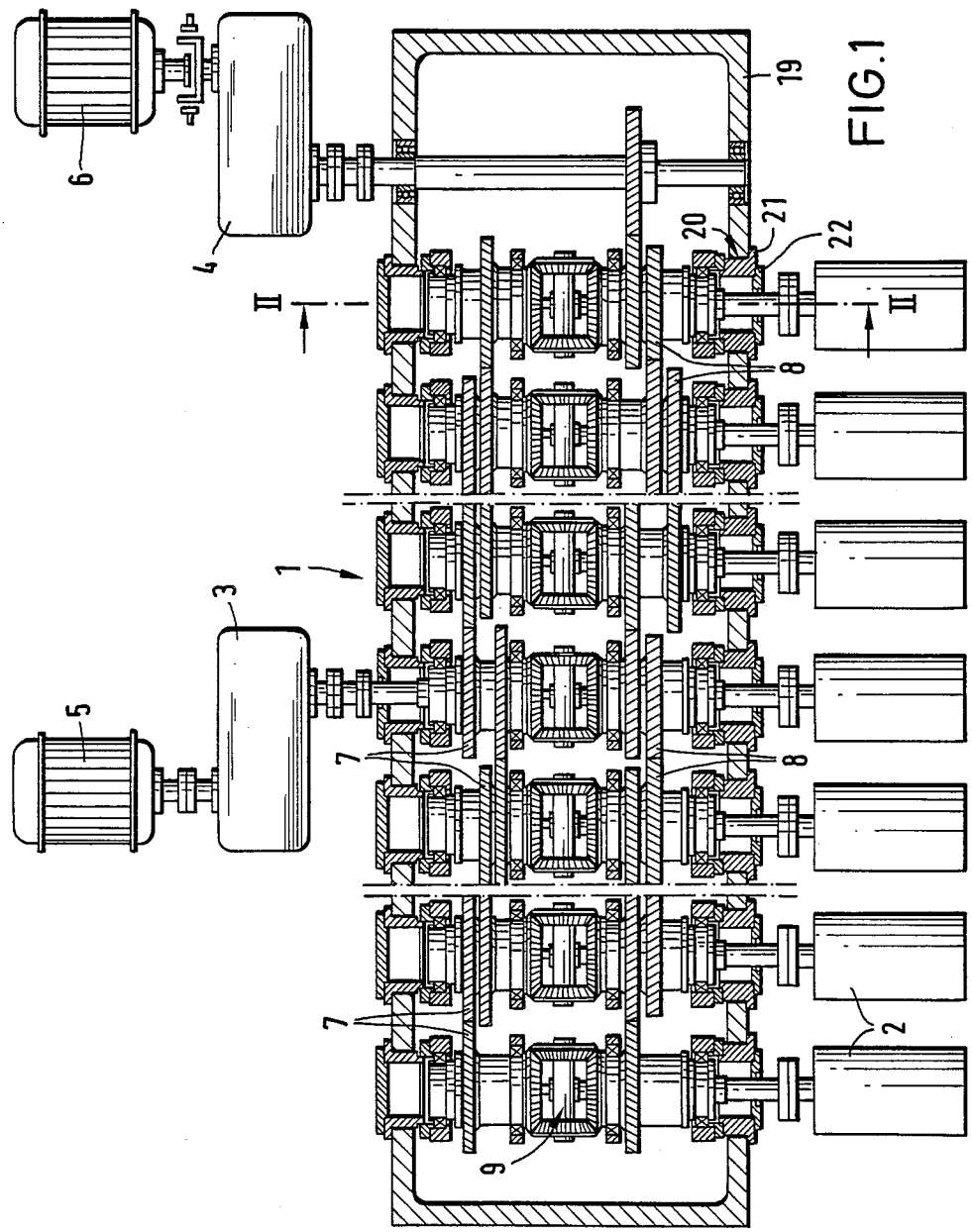
FIG. 1 shows a gear unit according to the invention in horizontal section.

The rolls (not shown) of the roll stands 2 are driven through the gear unit 1 and gear reducer units 3 and 4 by two motors 5 and 6. For the purpose of speed regulation, two motors 5, 6 are thus provided in this drive, of which one motor 5 generates a basic r.p.m., which is transferred over a gear drive unit path 7, possibly with intermediate transfers, to the individual drive shafts of the roll stands 2. The motor 6 can transfer an additional r.p.m. to the individual drive shafts of the roll stands 2 over a second gear drive unit path 8 in a similar manner. Two different r.p.m.'s thus are imposed on each drive shaft, which are combined by means of a planetary gear set 9 into one r.p.m., namely the actual drive r.p.m. of the roll stands 2.

Figure 2:
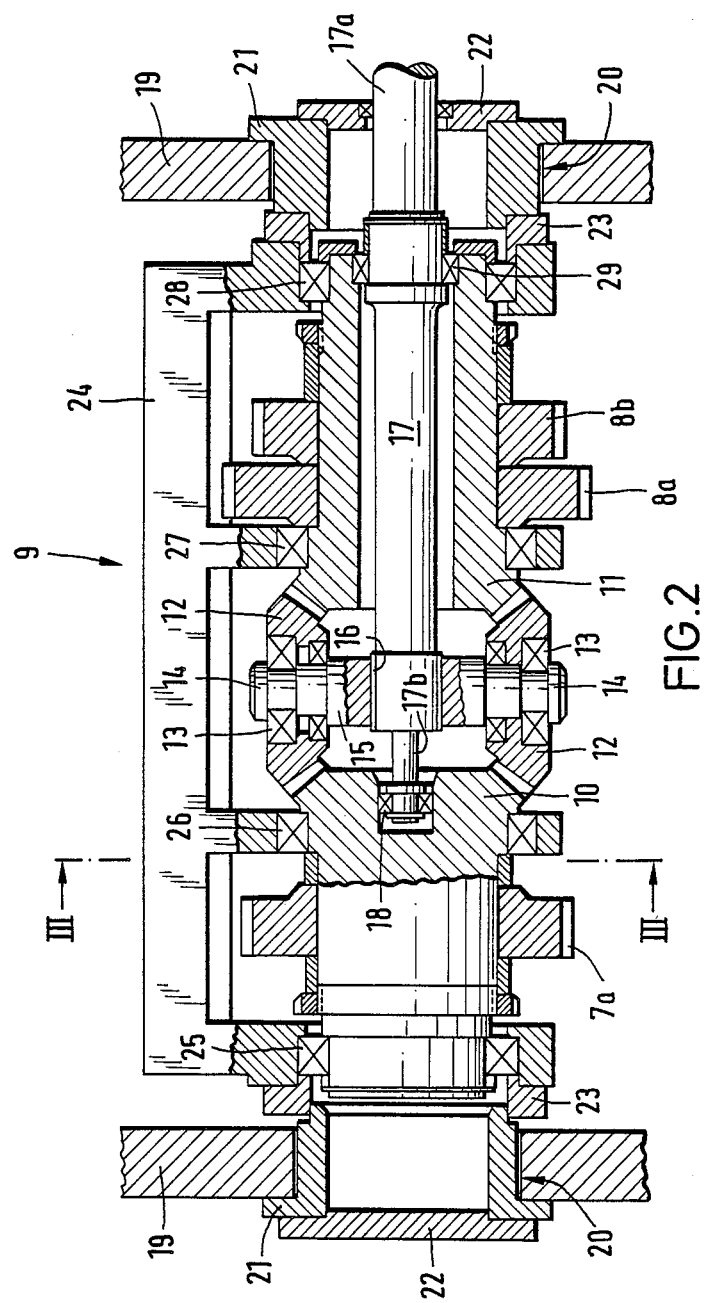
FIG. 2 shows a section along the line II—II of FIG. 1.

Such a planetary gear set 9 is shown separately in FIG. 2. It has two sun gears 10 and 11 and at least two planetary gears 12, which are rotatably supported through planetary gear bearings 13 on one planetary gear axis 14. The planetary gear axes 14 are distributed on the periphery of a planetary gear holder 15 which is provided with a hole 16, into which an output shaft 17 is inserted.

The output shaft 17 has an output journal 17a that is coupled through a clutch (not shown in FIG. 2) with a roll stand 2. On the other end section the output shaft 17 has a particularly slender bearing journal 17b, through which it is supported in the sun gear 10 with the aid of a movable bearing 18.

The gear unit 1 has a gear unit housing 19 and bearing holes 20 (see FIG. 1), into which bearing bushes 21 with bearing caps 22 are inserted from the outside. As is particularly evident in FIG. 2, the bearing bushes 21, which are fastened by bolts (not shown), act through holding bushes 23 to hold a crosshead 24 with bearings projecting in the radial direction 25-28. Two bearings 25 and 28 act together with the holding or retaining bushes 23 and bearing bushes 21 to fasten the crosshead 24 in the gear unit housing 19. The cross head 24 can be considered a part of the gear unit housing 19 because it serves as the latter for supporting the gears. For a clearer representation of the planetary gear set 9, the crossheads 24 are omitted in FIG. 1 because otherwise they would partially cover them. The bearings 25 and 26 hold the sun gear 10 in the axial and radial directions and the bearings 27 and 28 hold the sun gear 11 in the same manner. A gear 7a of the toothed gearing path 7 is located rotation-proof on the bearing sleeve of the sun gear 10 and two gears 8a and 8b of the toothed gearing path 8 on the bearing sleeve of the sun gear 11. The rotational movements and torques of the motors 5 and 6 are applied in this manner through the toothed gearing paths 7 and 8 on the sun gears 10 and 11. However, the latter are supported through their bearing sleeves in the bearings 25 and 26 or 27 and 28 of the crosshead 24 and in no way load the output shaft 17. The latter is supported with a fixed bearing 29 in the bearing sleeve of the sun gear 11 and at the other end section in the movable bearing 18 already mentioned.

The output shaft 17 has a crowned external toothing in the region of the hole 16 of the planetary gear holder 15, which engages in a rotation-proof manner in a corresponding internal toothing of the hole 16 of the planetary gear holder 15. Due to the only slight and thus imperceptible (in FIG. 2) crowning of the toothing of the output shaft 17, the planetary gear holder 15 and the planetary gear axes 14 are capable of effecting a limited oscillating movement, such that the planetary gears 12 can be adapted to the sun gears 10 and 11. The long journal 17b is dimensioned in diameter so that it permits a limited radial movement of the output shaft 17 in the region of the planetary gears 12 so that the latter can also adapt radially to the output shaft 17. It is obvious that the said adjustment movements are only very slight and compensate only unavoidable manufacturing and assembly tolerances so that all the planetary gears are loaded identically.

Figure 3:
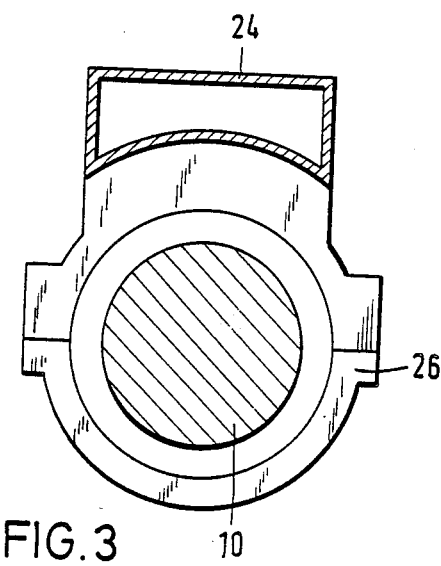
FIG. 3 shows a section along the line III—III of FIG. 2.

It is clearly evident in FIG. 3 that the crosshead 24 is relatively narrow and thus takes up little room in the longitudinal direction of the gear unit 1. The small distance from output shaft 17 to output shaft 17 can consequently be maintained. Nor do the bearings 26 require any more room in the radial direction than the planetary gears 12 with their planetary gear axes 14, which is evident from FIG. 2.

We claim:

1. Gear unit for driving a roll of a roll train with a number of consecutively arranged roll stands, in which a planetary gear set comprised of bevel gears is provided at at least one output shaft, the planetary gear axis or axes of which extend crosswise to the output shaft and the sun gears of which are arranged coaxially to the drive shaft, characterized in that neither the sun gears nor the other gears are supported on the output shaft, but in the gear unit housing and the latter has a cross head running parallel to the output shaft and with radially projecting bearings for supporting the gears in the region of the planetary gear set.

2. Gear unit according to claim 1, characterized in that the crosshead is detachably fastened to the walls of the gear unit housing and forms a separate insertable and removable unit with the planetary gear set.

3. Gear unit according to claim 2, characterized in that the crosshead is held by means for bearing bushes that can be inserted from the outside in the bearing holes of the housing wall.

4. Gear unit according to claim 1, characterized in that the output shaft is flexible in the radial direction in the region of the planetary gears.

5. Gear unit according to claim 4, characterized in that the output shaft has a bearing journal that is considerably thinner in diameter in the region of the planetary gears and holds the output shaft flexibly in the radial direction by means of a movable bearing.

6. Gear unit according to claim 1, characterized in that the output shaft is inserted into a hole of a planetary gear holder in an axially displaceable manner, but rotation-fast, and which has radially running planetary gear axes distributed over its periphery.

7. Gear unit according to claim 6, characterized in that the hole of the planetary gear holder has internal toothing in which the output shaft engages with a crowned external toothing.

* * * * *